US011691281B2

(12) United States Patent
Verdi et al.

(10) Patent No.: US 11,691,281 B2
(45) Date of Patent: Jul. 4, 2023

(54) ROBOT CONTROL AT SINGULAR CONFIGURATIONS

(71) Applicant: Massachusetts Institute of Technology, Cambridge, MA (US)

(72) Inventors: David Verdi, Cambridge, MA (US); Neville Hogan, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 259 days.

(21) Appl. No.: 17/088,397

(22) Filed: Nov. 3, 2020

(65) Prior Publication Data

US 2021/0138642 A1 May 13, 2021

Related U.S. Application Data

(60) Provisional application No. 62/932,648, filed on Nov. 8, 2019.

(51) Int. Cl.
*B25J 9/16* (2006.01)
*G05B 19/404* (2006.01)

(52) U.S. Cl.
CPC .......... *B25J 9/1641* (2013.01); *B25J 9/1633* (2013.01); *G05B 19/404* (2013.01); *G05B 2219/39201* (2013.01)

(58) Field of Classification Search
CPC ...... B25J 9/1641; B25J 9/1633; B25J 9/1607; B25J 9/1643; B25J 9/1664; G05B 19/404; G05B 2219/39201; G05B 2219/40333; G05B 2219/40354; G05B 2219/39257
See application file for complete search history.

(56) References Cited

U.S. PATENT DOCUMENTS

| | | | |
|---|---|---|---|
| 10,335,946 B2 | 7/2019 | Hogan et al. | |
| 2014/0311271 A1* | 10/2014 | Cao | B25J 9/0036 901/19 |
| 2016/0221189 A1* | 8/2016 | Nilsson | B25J 9/1653 |
| 2018/0236659 A1* | 8/2018 | Hogan | B25J 9/1661 |

OTHER PUBLICATIONS

Choi, et al., "Stiffness Analysis and Control of Redundant Manipulators", 1994, Proceedings of the 1994 IEEE International Conference on Robotics and Automation, vol. 1, pp. 689-695 (Year: 1994).*

(Continued)

*Primary Examiner* — Khoi H Tran
*Assistant Examiner* — Tanner L Cullen
(74) *Attorney, Agent, or Firm* — Daly, Crowley, Mofford & Durkee, LLP

(57) ABSTRACT

According to some embodiments, a method includes: receiving an endpoint impedance matrix representing a desired stiffness or damping at the robot endpoint; reflecting the endpoint impedance matrix to an equivalent joint-space matrix associated with one or more of the robot joints, the equivalent joint-space matrix having a nullspace corresponding to near-zero-valued eigenvalues; generating a nullspace-filled impedance matrix from the equivalent joint-space matrix based in part on replacing the near-zero-valued eigenvalues with selected finite positive real values; generating a robot control law using the nullspace-filled impedance matrix; and using the robot control law to control the robot.

19 Claims, 7 Drawing Sheets

(56) References Cited

OTHER PUBLICATIONS

Craig, et al., "A Systematic Method of Hybrid Position/Force Control of a Manipulator;" Proceedings of the IEEE Computer Society's Third International Computer Software and Applications Conference; Jan. 1979; pp. 446-451; 6 Pages.
Denavit, et al., "A Kinematic Notation for Lower-Pair Mechanisms Based on Matrices;" Trans. of the ASME; Journal of Applied Mechanics, vol. 22; Jan. 1955; pp. 215-221; 7 Pages.
Dietrich, et al., "On Continuous Null Space Projections for Torque-Based, Hierarchical, Multi-Objective Manipulation;" Proceedings of the IEEE International Conference on Robotics and Automation (ICRA); May 14-18, 2012; pp. 2978-2985; 8 Pages.
Dietrich, et al., "An Overview of Null Space Projections for Redundant, Torque-Controlled Robots;" Article from the International Journal of Robotics Research, vol. 34, No. 11; Jan. 2015; 16 Pages.
Hogan, "Impedance Control: An Approach to Manipulation: Part I—Theory;" Journal of Dynamic Systems, Measurement and Control, vol. 107, No. 1; Mar. 1985; 24 Pages.
Khatib, "Inertial Properties in Robotic Manipulation: An Object-Level Framework;" The International Journal of Robotics Research, vol. 14, No. 1; Feb. 1995; 37 Pages.
Khatib, "A Unified Approach for Motion and Force Control of Robot Manipulators: The Operational Space Formulation;" IEEE Journal of Robotics and Automation, vol. RA-3, No. 1; Feb. 1987; pp. 43-53; 11 Pages.
Klein, et al., "Review of Pseudoinverse Control for Use with Kinematically Redundant Manipulators;" IEEE Transactions on Systems, Man, and Cybernetics, vol. SMC-13, No. 3; Mar./Apr. 1983; pp. 245-250; 6 Pages.
Mason, "Compliance and Force Control for Computer Controlled Manipulators;" IEEE Transactions on Systems, Man, and Cybernetics, vol. SMC-11, No. 6; Jun. 1981; pp. 418-432; 15 Pages.
Maurice, et al., "Velocity-Curvature Patterns Limit Human-Robot Physical Interaction;" IEEE Robotics and Automation Letters, vol. 3, No. 1; Jan. 2018; 8 Pages.
Muhammad, "Impedance Control of Redundant Manipulators;" Thesis; Tampereen Teknillinen Yliopisto—Tampere University of Technology; Publication 986; Nov. 4, 2011; 171 Pages.
Mussa-Ivaldi et al., "Integrable Solutions of Kinematic Redundancy Via Impedance Control;" International Journal of Robotics Research; Aug. 1988; 21 Pages.
Pratt, et al., "Series Elastic Actuators;" Proceedings of International Conference on Intelligent Robots and Systems; Jan. 1995; pp. 399 to 406; 8 Pages.
Rancourt, et al., "Stability in Force-Production Tasks;" Journal of Motor Behavior, vol. 33, No. 2; Jun. 2001; pp. 193-204; 12 Pages.
Schindlbeck, et al., "Unified Passivity-Based Cartesian Force/Impedance Control for Rigid and Flexible Joint Robots via Task-Energy Tanks;" IEEE International Conference on Robotics and Automation (ICRA); May 26-30, 2015; pp. 440-447; 8 Pages.
Schneider, et al., "Object Impedance Control for Cooperative Manipulation: Theory and Experimental Results;" IEEE Transactions on Robotics and Automation, vol. 8, No. 3; Jan. 1989; 8 Pages.
Sirkin, et al., "The Robotics Revolution: The Next Great Leap in Manufacturing;" The Boston Consulting Group; Sep. 2015; 28 Pages.
Van De Vegte, et al., "Teleoperator Control Models: Effects of Time Delay and Imperfect System Knowledge;" IEEE Transactions on Systems, Man, and Cybernetics, vol. 20, No. 6; Nov./Dec. 1990; pp. 1258-1272; 15 Pages.
Verdi, "A Compositional Approach to Robotic Impedance Control;" Department of Mechanical Engineering; Massachusetts Institute of Technology; Jun. 2019; 129 Pages.
Welch, "Navigation and Manipulation for Autonomous Underwater Dismantling of Offshore Structures;" Unpublished Doctoral Dissertation, Massachusetts Institute of Technology and Woods Hole Oceanographic Institution; Sep. 2015; 99 Pages.
Whitney, "Resolved Motion Rate Control of Manipulators and Human Prostheses;" IEEE Transactions on Man-Machine Systems, vol. MMS-10, No. 2; Jun. 1969; 7 Pages.

* cited by examiner

ROBOT CONTROL AT SINGULAR CONFIGURATIONS

CROSS-REFERENCE TO RELATED APPLICATIONS

This application claims the benefit under 35 U.S.C. § 119 of provisional patent application No. 62/932,648 filed on Nov. 8, 2019, which is hereby incorporated by reference herein in its entirety.

BACKGROUND

As is known in the art, robot performance has seen tremendous improvements over the past several decades. Nevertheless, humans still vastly outperform robots in tasks that involve complex dynamic interactions with the environment, particularly those which involve manipulation into kinematic singularities, and those which might involve collaborative or closed kinematic chain manipulation with multiple actuators. For instance, a woodcarver might take a delicate workpiece with complex geometric features and proceed to scrub or sand its intricate contours. A painter might extend her arm to the edge of her dexterous workspace to carefully apply spackle to a difficult to reach location. A shoeshiner might stretch out a cloth between his hands and use it to rapidly buff a leather shoe.

In general, humans seamlessly transition from free to constrained motions, and can readily perform dynamic interaction tasks into and out of kinematic singularities. They easily manipulate a variety of compliant and non-compliant objects with two hands, or even coordinate large object manipulation with several other people. Such tasks, while performed by humans with relative ease, can be challenging to program on a robot.

Physical human-robot cooperation and collaboration is emerging as a new growth area for robotic applications. Successful physical cooperation can be facilitated if the robot exhibits human-like characteristics. Human-like characteristics include the versatility that comes with a high degree of redundancy, i.e. many more controllable degrees of freedom than are required to perform typical tasks, and robots with substantial redundancy are emerging.

Conventional methods to manage redundancy include inversion of the robot's kinematic equations to determine a configuration-space trajectory that is compatible with a desired motion. However this approach can become numerically unstable at or near singular configurations. As a result, conventional robots typically do not operate near singular configurations. In contrast, humans routinely operate at singular configurations and take advantage of them. For example, humans stand with the legs straight, a singular configuration of the lower limbs, thereby reducing the effort required to stand.

An alternative approach to managing redundancy is to take advantage of the compositionality of mechanical impedance to enable a modular approach to robot programming. U.S. Pat. No. 10,335,946 ("the '946 patent"), filed on Feb. 2, 2017 and issued on Jul. 2, 2019, describes systems and methods for compositional impedance programming for robots. The '946 patent is herein incorporated by reference in its entirety. Embodiments described in the '946 patent circumvent kinematic inversion and enable operation into singular configurations.

SUMMARY

It is appreciated herein that the superposition of different mechanical impedances may result in a net behavior that diverges from that desired or appropriate for a task.

Disclosed herein are concepts, structures, and techniques for compositional impedance control, or linearly superimposing impedance controllers on a robot, which can be used to narrow (and ideally close) the robot-human performance gap. Embodiments of the present disclosure provide a control scheme and framework that can be applied to redundancy resolution, controlling closed kinematic chains, managing collaborative manipulation, and tackling high degree-of-freedom (DoF) manipulation tasks. The disclosed control scheme can be implemented within a robot, such as the Baxter Research Robot.

In some embodiments of the present disclosure, a method can enable superposition of different impedances with no interference. That is, the task-relevant impedance is not distorted by the superposition of impedances for secondary purposes (e.g. managing redundant degrees of freedom). In contrast to kinematic inversion, the disclosed method is numerically stable at singular configurations. Moreover, unlike existing "null-space projection" methods, which can induce a discontinuous change of actuator torque on reaching a singular configuration, the disclosed method enables smooth transition into singular configurations.

The concepts, structures, and techniques disclosed herein can enable and encourage exploitation of singular configurations without interfering with the production of any desired behavior that is within the robot's capacity. This may reduce the actuator effort required to support weight against gravity. That, in turn, may improve efficiency and extend endurance (e.g. battery life). In addition, aside from reduced effort and increased efficiency, operation at singular configurations can enable a greater range of achievable mechanical impedance behaviors. While a robot's stiffness may be limited by the inevitable compliance of its actuators and drive train, by operating at singular configurations, stiffness in some directions is limited only by the robot's structural elements.

According to one aspect of the present disclosure, a computer-implemented method can be used to control a robot having an endpoint and a plurality of joints providing more than three degrees of freedom (DoFs). The method can include: receiving an endpoint impedance matrix representing a desired stiffness or damping at the robot endpoint; reflecting the endpoint impedance matrix to an equivalent joint-space matrix associated with one or more of the robot joints, the equivalent joint-space matrix having a nullspace corresponding to near-zero-valued eigenvalues; generating a nullspace-filled impedance matrix from the equivalent joint-space matrix based in part on replacing the near-zero-valued eigenvalues with selected finite positive real values; generating a robot control law using the nullspace-filled impedance matrix; and using the robot control law to control the robot.

In some embodiments, the method can include: determining forces/torques at the endpoint resulting from contact between the endpoint and an environment of the robot; generating a kinematic stiffness matrix based on the forces/torques at the endpoint; and generating the equivalent joint-space matrix using the kinematic stiffness matrix.

In some embodiments, the method may include: in response to detecting that the robot is approaching a kinematic singularity, updating the robot control law by iteratively increasing one or more eigenvalues approaching zero as the singularity is neared from a threshold value to the corresponding selected finite positive real value, wherein the threshold value is less than the corresponding selected final positive real value; and using the updated robot control law to control the robot. In certain embodiments, the threshold value can be selected based on a floating point arithmetic precision of the computer.

According to another aspect of the present disclosure, a method for controlling a robot having an endpoint and a plurality of joints providing more than three degrees of freedom (DoFs) includes selecting impedance parameters for each of a plurality of impedance modules, wherein each of the plurality of impedance modules specifies a robot behavior associated with a task. For one or more of the impedance modules, the method includes: receiving an endpoint impedance matrix representing a desired stiffness or damping at the robot endpoint, reflecting the endpoint impedance matrix to an equivalent joint-space matrix associated with one or more of the robot joints, the equivalent joint-space matrix having a nullspace corresponding to near-zero-valued eigenvalues, generating a nullspace-filled impedance matrix from the equivalent joint-space matrix based in part on replacing the near-zero-valued eigenvalues with selected finite positive real values, and defining an impedance control law for the module using the nullspace-filled stiffness matrix and the impedance parameters selected for the module. The method further includes generating a composite control law for the robot using impedance module control laws defined for the impedance modules, and using the composite control law to control the robot.

In some embodiments, the method can further include: determining forces/torques at the endpoint resulting from contact between the endpoint and an environment of the robot; generating a kinematic stiffness matrix based on the forces/torques at the endpoint; and generating the equivalent joint-space matrix using the kinematic stiffness matrix. In some embodiments, the method can include: in response to detecting that the robot is approaching a kinematic singularity, updating the robot control law by iteratively increasing one or more eigenvalues approaching zero as the singularity is neared from a threshold value to the corresponding selected finite positive real value, wherein the threshold value is less than the corresponding selected final positive real value; and using the updated robot control law to control the robot. In some embodiments, the threshold value is selected based on a floating point arithmetic precision of the computer.

In some embodiments, the method can further include: transforming one or more of the impedance module control laws into configuration space, wherein generating the composite control law for the robot includes generating the composite control law using the impedance module controls laws transforming into configuration-space. In some embodiments, at least one of the impedance modules defines a damped spring control law to manipulate an object using an end-effector of the robot. In some embodiments, at least one of the impedance modules may define a damped spring control law to manipulate an object using an elbow of the robot. In some embodiments, at least one of the impedance modules imposes a base joint stiffness on the robot. In some embodiments, selecting impedance parameters for each of a plurality of impedance modules can include selecting, for at least one of the impedance modules, a resting position, a stiffness, and a damping coefficient for a damped spring control law. In some embodiments, selecting impedance parameters for each of a plurality of impedance modules may include selecting, for at least one of the impedance modules, a base joint stiffness for the robot. In some embodiments, selecting the base joint stiffness for the robot can include selecting a base joint stiffness to reduce apparent end-effector mass normal to an object's surface.

According to another aspect of the present disclosure, a system includes: a robot having an endpoint and a plurality of joints providing more than three degrees of freedom (DoFs) and an impedance controller. The impedance controller is configured to: receive an endpoint impedance matrix representing a desired stiffness or damping at the robot endpoint; reflect the endpoint impedance matrix to an equivalent joint-space matrix associated with one or more of the robot joints, the equivalent joint-space matrix having a nullspace corresponding to near-zero-valued eigenvalues; generate a nullspace-filled impedance matrix from the equivalent joint-space matrix based in part on replacing the near-zero-valued eigenvalues with selected finite positive real values; generate a robot control law using the nullspace-filled impedance matrix; and use the robot control law to control the robot.

In some embodiments, the impedance controller can be further configured to: determine forces/torques at the endpoint resulting from contact between the endpoint and an environment of the robot; generate a kinematic stiffness matrix based on the forces/torques at the endpoint; and generate the equivalent joint-space matrix using the kinematic stiffness matrix. In some embodiments, the impedance controller can be further configured to: in response to detecting that the robot is approaching a kinematic singularity, update the robot control law by iteratively increasing one or more of eigenvalues approaching zero as the singularity is neared from a threshold value to the corresponding selected finite positive real value, wherein the threshold value is less than the corresponding selected final positive real value; and use the updated robot control law to control the robot. In some embodiments, the threshold value can be selected based on a floating point arithmetic precision of the computer.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some concepts and terminology are explained.

The behavior and dynamics of a robot may be described in several related geometric spaces. The behavior of a robot end-effector and its relation to external locations and objects is best described in external coordinates of "world space." This is usually defined by Cartesian coordinates with respect to a well-defined reference frame such as the base of the robot. Cartesian coordinates of an end-effector are often defined by six degrees of freedom: translations in three orthogonal directions and rotations about three orthogonal axes. Alternatively, the kinematics and dynamics of a robot mechanism are best described in joint coordinates or "configuration space." Configuration space is usually identified with generalized coordinates (as defined in classical mechanics): angles of revolute joints and translations of prismatic joints. Configuration space may have many more degrees of freedom than an end effector; in that case the robot is kinematically redundant with respect to that end-effector. The relation (or transformation) between configuration space and world space is fully defined by the kinematic equations of the robot, determined by the geometry and design of the machine.

As is known in the art, a robot which is stable during unrestrained motion may become unstable upon contact with or physical coupling to an object or a rigid surface. Most objects and rigid surfaces are "energetically passive." Energetically passive objects cannot continuously supply mechanical power in response to forces and motions imposed upon them. It has been shown that if a robot exhibits interactive behavior equivalent to that of an energetically passive object, physical contact with an unknown passive object cannot induce instability. Therefore, if mechanical impedance is constrained to be energetically passive, physical contact cannot induce instability.

As used herein, the term "module" generally refers to a collection of hardware and/or software configured to perform and execute the processes, steps, or other functionality described in conjunction therewith.

Figure 1:
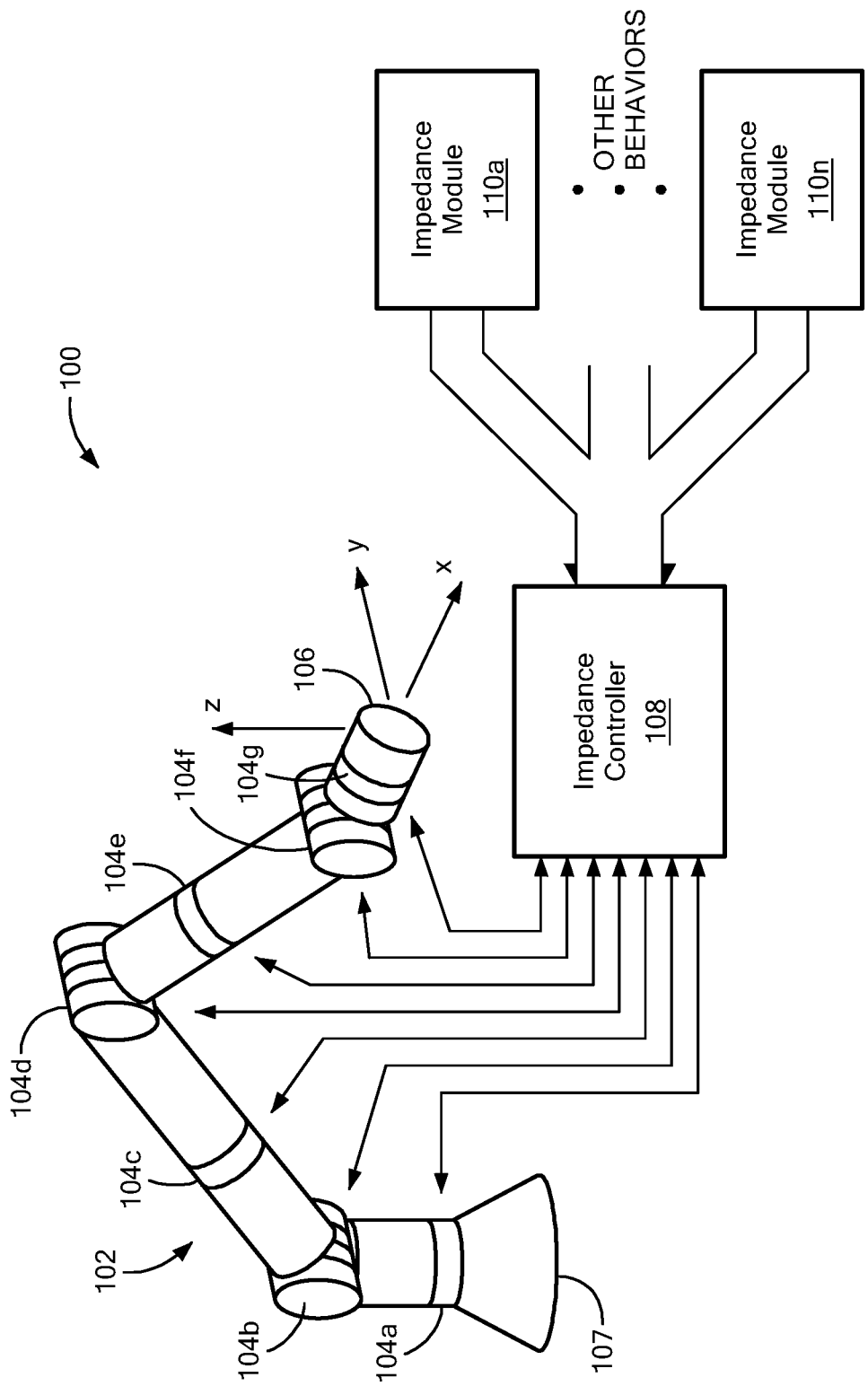
FIG. 1 is a schematic diagram illustrating an impedance controller for controlling a single-arm robot, according to some embodiments of the disclosure.

Referring to FIG. 1, compositional impedance programming is illustrated using a single-arm robot. In the embodiment shown, an illustrative system 100 includes a robot 102, an impedance controller 108, and a plurality of impedance modules 110a . . . 110n (110 generally).

The robot 102 includes an end-effector 106 coupled to a trunk 107 via a series of joints 104a . . . 104g (104 generally). The joints 104 provide multiple degrees of freedom (e.g., six or seven degrees of freedom) to the end-effector 106 relative to the trunk 107. The robot joints 104 may be driven by force- or torque-controlled actuators. Non-limiting examples of actuators that may be used include series elastic actuators (SEAs), variable-impedance actuators, and current-controlled electric motors.

The controller 108 is configured to receive impedance control parameters from each of the impedance modules 110 and, based on a composition of the received impedance parameters, to generate and send force/torque control signals to the joint 104 actuators. The controller 108 also receives force/torque feedback information from the joint actuators.

In certain embodiments, one or more of the impedance modules 110 may be energetically passive. It is appreciated that using robot impedance modules that are energetically passive substantially guarantees that the robot 102 cannot be destabilized by physical contact with a human, thereby enhancing safety.

The concepts and techniques disclosed here can be extended to an arbitrary number of impedance modules 110. A given impedance module 110 may control the movement of a given robot "body part" or the robot's configuration. As explained below, multiple impedance modules 110 can be readily combined—using the principle of superposition—to program complex robot behavior.

A general description of concepts and techniques that may be utilized within the impedance modules 110 and controller 108 are described next.

A robot's configuration space (e.g., the configuration space of robot 102) may be defined by generalized coordinates $\theta$. The transformation of motion variables (position, velocity, etc.) from the robot's configuration space to any other point on the robot, e.g. its end-effector 106, is well-defined. The relation between an end-effector's position x and generalized coordinates can be determined by the kinematic equations $x=L(\theta)$. The relation between end-effector velocity $\dot{x}$ and generalized velocity $\dot{\theta}$ is $\dot{x}=J(\theta)\dot{\theta}$ where $J(\theta)$ is the configuration-dependent Jacobian matrix, which may be non-square, e.g. if the robot is kinematically redundant.

Conversely, the relation between a force or torque exerted at any point on the robot (e.g. end-effector 106) and generalized forces conjugate to generalized displacements (e.g. actuator torques) is also well-defined. The relation between end-effector force/torque f and actuator torque $\tau$ may be expressed as $\tau=J^T(\theta)f$.

Mechanical impedance is an operator that relates motion to force, $f(t)=Z\{x(t)\}$ The operator $Z\{\cdot\}$ may be linear, nonlinear, static, dynamic, etc., but is chosen to be well-defined. Advantageously, the mechanical impedance operator can be transformed to a corresponding configuration-space impedance $Z_{cs}\{\cdot\}=J^T(\cdot)Z\{L(\cdot)\}$, where $\tau(t)=Z_{cs}\{\theta(t)\}$, without inverting the kinematic equations.

For clarity, a simple example follows. The behavior of a "virtual" damped spring connected to a robot end-effector may be modeled as:

$$f_{ef}=k_{ef}(x_{ef0}-x_{ef})+b_{ef}(\dot{x}_{ef0}-\dot{x}_{ef}) \quad \text{(Eq. 1)}$$

in which:
$f_{ef}$ denotes an end-effector force;
$k_{ef}$ denotes a stiffness of the virtual spring;
$x_{ef0}$ denotes a "rest" position of the virtual spring;
$x_{ef}$ denotes a current position of the end-effector;
$b_{ef}$ denotes a damping coefficient of the virtual spring;
$\dot{x}_{ef}$ denotes a velocity at the current end-effector position;
an overdot denotes a time derivative; and
$\dot{x}_{ef0}$ denotes a velocity at the rest position of the virtual spring.

It will be understood that, if the so-called "virtual" damped spring were an actual damped spring connected to the end-effector, it would tend to drive an end effector towards the rest position $x_{ef0}$. The damping coefficient $b_{ef}$ can be selected, on a per end-effector basis, based on the desired behavior of that end-effector in a given application.

Transforming this behavior to configuration space identifies a nonlinear control law:

$$\tau_{ef} = J_{ef}^T(\theta)[k_{ef}(x_{ef0} - L_{ef}(\theta)) + b_{ef}(\dot{x}_{ef0} - J_{ef}(\theta)\dot{\theta})] \quad \text{(Eq. 2)}$$

in which:

$\tau_{ef}$ denotes the torque generated by this controller;
$\theta$ denotes the configuration variables of the robot;
$\dot{\theta}$ denotes the robot's velocity in configuration space;
$L_{ef}$ denotes the forward kinematic equations relating the robot configuration to end-effector position;
$J_{ef}$ denotes the corresponding Jacobian matrix; and
$J_{ef}^T$ denotes a transpose of Jacobian matrix $J_{ef}$.

This control law implements a "virtual" damped spring that drives the end effector towards the position $x_0$. It will be appreciated that the control law above does not require inversion the robot's kinematic equations. As a result this control law can function at and through the robot's kinematic singularities.

The aforementioned damped spring model $f_{ef} = k_{ef}(x_{ef0} - x_{ef}) + b_{ef}(\dot{x}_{ef0} - \dot{x}_{ef})$ and its constituent impedance parameters may correspond to (i.e., be implemented or encoded within) an impedance module 110 in FIG. 1. An impedance module 110 provides information to the impedance controller 108 that can be used to control the joint 104 actuators and, in turn, the position of the end-effector 106. The controller 108 can control end-effector 106 during free motion, during contact with objects, and/or during transitions between these two states.

It should be understood that the impedance module described above does not directly control the robot configuration (i.e., the orientation of the various joints 104). To drive the robot to a desired configuration $\theta_0$, a second impedance module 110 may be provided which defines a "virtual" configuration-space damped spring. The configuration-space damped spring may be described as:

$$\tau_c = K(\theta_0 - \theta) - B(\dot{\theta})$$

in which:

K denotes a stiffness of the joints; and
B denotes a damping coefficient of the joints.

The two impedance modules 100 described above can be added together to define a non-linear control law:

$$\tau_{ef+c} = J_{ef}^T(\theta)[k_{ef}(x_{ef0} - L_{ef}(\theta)) + b_{ef}(\dot{x}_{ef0} - J_{ef}(\theta)\dot{\theta})] + K(\theta_0 - \theta) - B(\dot{\theta}) \quad \text{(Eq. 3)}$$

The resulting control law (referred to herein as a "composite control law") drives the end-effector 106 towards the position $x_0$ while the robot configuration tends towards the configuration $\theta_0$. The steady-state end-effector position and robot configuration compromise between the two dynamic attractors $x_0$ and $\theta_0$ to reduce (and ideally minimize) the amount of "energy" stored in the virtual springs defined by $k_{ef}$ and K. Such a combination of impedance modules can provide simultaneous control of robot's end-effector and redundant degrees of freedom.

The end-effector virtual spring stiffness $k_{ef}$ can be selected to dominate the configuration-space virtual spring stiffness $K_c$ in order to drive the robot configuration to be approximately compatible with $x_0$. This may be achieved if $K_c \ll J_{ef}^T(\theta) k_{ef} J_{ef}(\theta)$.

A similar approach may be applied at any other point on the robot 102. Thus, for example, using subscript e to denote the elbow, the impedance module $f_e = k_e(x_{e0} - x_e) + b_e(\dot{x}_{e0} - \dot{x}_e)$ may describe a "virtual" damped spring behavior connected to the elbow. Such a behavior may be implemented by a nonlinear configuration-space control law $\tau_e = J_e^T(\theta)[k_e(x_{e0} - L_e(\theta)) + b_e(\dot{x}_{e0} - J_e(\theta)\dot{\theta})]$. This impedance module can be combined with the impedance-based control laws described above. In particular, the end-effector virtual damped spring and the elbow virtual damped spring may be added together to define a nonlinear control law:

$$\tau_{ef+e} = J_{ef}^T(\theta)[k_{ef}(x_{ef0} - L_{ef}(\theta)) + b_{ef}(\dot{x}_{ef0} - J_{ef}(\theta)\dot{\theta})] + J_e^T(\theta) [k_e(x_{e0} - L_e(\theta)) + b_e(\dot{x}_{e0} - J_e(\theta)\dot{\theta})]$$

This composite control law drives the end-effector 106 towards the position $x_0$ while the elbow tends towards the position $x_{e0}$. If both positions are compatible with the robot's kinematics, both will be reached exactly in steady-state. If they are not, the steady-state robot configuration will be a compromise between the two dynamic attractors $x_0$ and $x_{e0}$ to reduce (and ideally minimize) the amount of "energy" stored in the virtual springs defined by $k_{ef}$ and $k_e$. It is appreciated that the combination of impedance modules provides a way to control the robot's end-effector 106 and redundant degrees of freedom simultaneously.

Figure 1A:
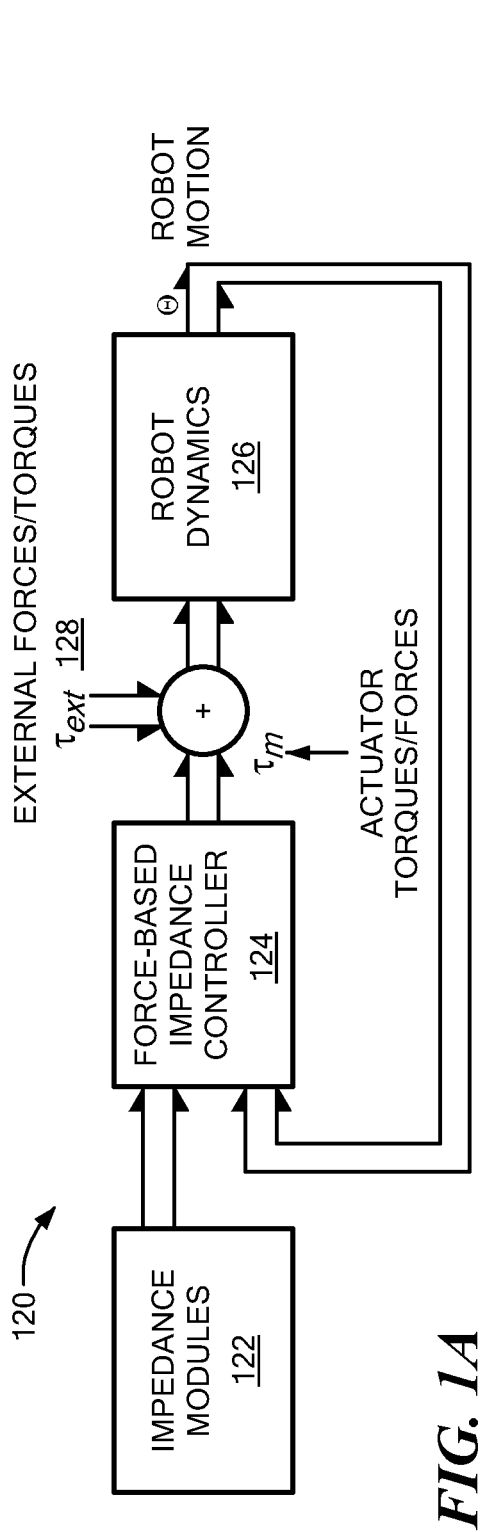
FIG. 1A is a block diagram showing a robot control system using compositional impedance programming, in conjunction with force-based impedance control.

Referring now to FIG. 1A, a robot control system 120 includes a plurality of impedance modules 122 and a force-based impedance controller 124 coupled to a set of robot dynamics 126. An impedance module 122 may be the same as or similar to an impedance module 110 shown in FIG. 1 and described above in conjunction therewith, as may the impedance controller 124 be the same or similar to controller 108. The set of robot dynamics 126 may correspond to a set of force- or torque-controlled actuators (e.g., actuators for joints 104 in FIG. 1).

As described above in conjunction with FIG. 1, an impedance module 122 can be used to control the position of a robot "body part" and/or to drive the robot to a desired configuration. Such an impedance module 122 can define a mechanical impedance control law and corresponding parameters (e.g., the stiffness, damping coefficient, and resting position of a damped spring).

The force-based impedance controller 124 receives the impedance control law parameters from the impedance modules 122 and generates a composite control law by summing (i.e., superimposing) the individual impedance module control laws. In the case where an impedance module 122 specifies an impedance control law in Cartesian-space, the impedance controller 124 may transfer the control law to configuration space using a Jacobian matrix associated with the end-effector.

The impedance controller 124 also receives actual robot configuration $\theta$ and velocity $\dot{\theta}$ information as feedback from the robot dynamics 126. The impedance controller 124 uses the composite control law along with the actual robot configuration $\theta$ and corresponding configuration-space velocity $\dot{\theta}$ to calculate a torque (denoted $\tau_m$ in FIG. 1A). The torque $\tau_m$ (referred to herein as the "actuator torque") represents the torque required to be applied by one or more actuators to the robot mechanism (i.e., robot dynamics 126) to achieve the desired behaviors specified by the impedance modules 122 (e.g., to move an end-effector to its desired position $x_{ef0}$ while driving the robot toward a desired configuration $\theta_0$).

The system 120 may also be influenced by external forces 128 (denoted as a torque $\tau_{ext}$) which are shown in FIG. 1A as being combined with the actuator torque $\tau_m$ and provided to the robot dynamics 126. Thus, the impedance controller may also take into account external forces 128 when determining the torque $\tau_m$ required to move the desired robot to the desired position/configuration. External forces may arise when motion of an object held by the robot end-effector is opposed by the inertia and friction of the object. The forces required to move the object exert reaction forces on the end-effector. Those "external" forces $f_{ext}$ in turn exert "external" torques $\tau_{ext}$ on the robot joints, where $\tau_{ext}=J_{ef}^T(\theta)f_{ext}$. External torques and actuator torques combine by simple addition to act on the robot mechanism.

It should be understood the impedance module impedance parameters, actuator torque $\tau_m$, external torque $\tau_{ext}$, actual robot configuration $\theta$, and/or actual configuration-space velocity $\dot{\theta}$ may be provided as vector quantities, as illustrated using double connector lines in FIG. 1A.

In various embodiments, the impedance controller 124 includes real-time control software configured to implement the composite control law.

Figure 1B:
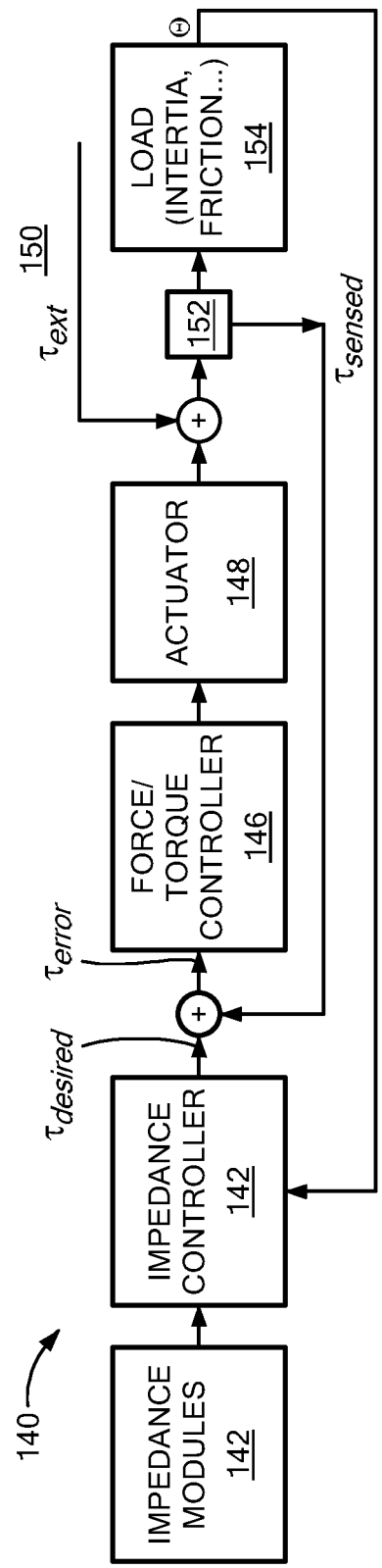
FIG. 1B is a more detailed block diagram of a robot control system using compositional impedance programming, in conjunction with force-based impedance control.

FIG. 1B is a more detailed diagram of a robot control system 140 using compositional impedance programming, according to some embodiments. The system 140 is shown as having a single degree of freedom (e.g., a single actuator), however the structures and concepts shown in the figure and described herein can be applied to an arbitrary number of degrees of freedom. The illustrative system 140 includes impedance modules 142, impedance controller 144, force/torque controller 146, and actuator 148.

The impedance controller 144 receives impedance parameters from impedance modules 142 and uses this information to derive a composite control law. The impedance controller 144 also receives the actual robot configuration $\theta$ and configuration-space velocity $\dot{\theta}$ and, using the composite control law, calculates an actuator torque $\tau_m$, which is provided to the force/torque controller 146. The force/torque controller 146 drives the actuator 148 according to the received actuator torque. The impedance controller 144 and/or force/torque controller 146 may take into account external forces 150 (denoted as torque $\tau_{ext}$ in the figure). The actual robot configuration $\theta$ and configuration-space velocity $\dot{\theta}$ result not only from the actuator torque and external forces (i.e., $\tau_m+\tau_{ext}$), but also the mechanical impedances acting on the system, such as inertia and friction, as illustrated by load 154.

The system 140 also includes a torque sensor 152 to determine the actual (or "sensed") torque $\tau_{sensed}$ exhibited by the actuator 148. The actual torque $\tau_{sensed}$ is summed with the impedance controller output (i.e., with desired torque $\tau_{desired}$), as shown. The actual torque $\tau_{sensed}$ is "signed" to generate a signal (denoted $\tau_{error}$) proportional to the error between the desired torque and actual/sensed torque. The force/torque controller 146 is configured to reduce (and, in some cases, to minimize or eliminate) the error $\tau_{error}$.

It will be understood that FIGS. 1A and 1B depict embodiments of a force-based impedance control system. In other embodiments, position-based impedance control may be used. A person skilled in the art will understand how to apply the compositional impedance programming concepts and techniques described to position-based impedance control systems.

Figure 2:
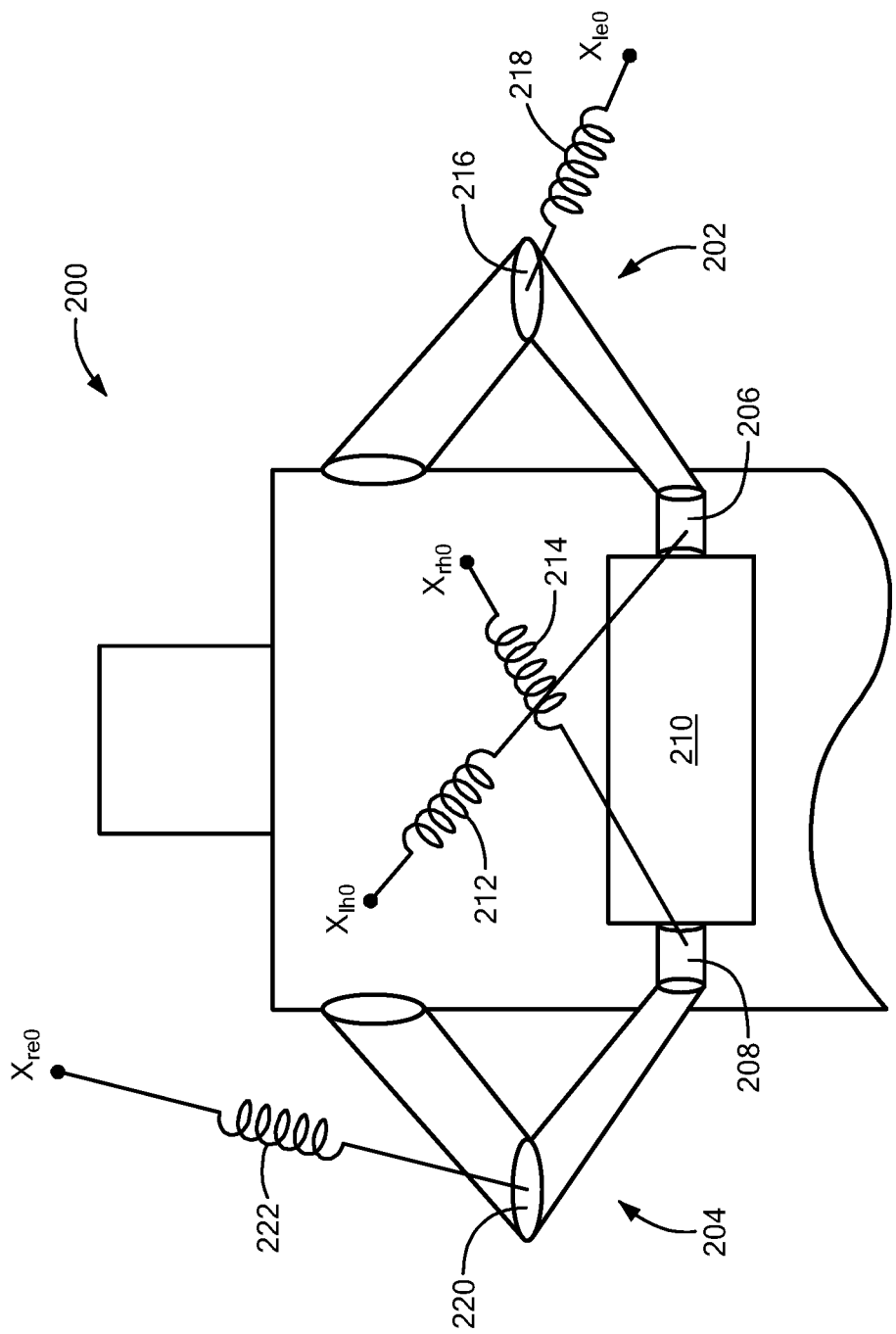
FIG. 2 is diagrammatic illustration of compositional impedance control applied to coordinate multiple robot arms to manipulate an object.

Referring to FIG. 2, compositional impedance programming may be extended to multiple robot end-effectors (e.g., multiple hands or fingers) interacting physically with each other or via a commonly held object. As illustrated in FIG. 2, a robot 200 may include a left arm 202 having a first end-effector ("left hand") 206, and a right arm 204 having a second end-effector ("right hand") 208. Each of the arms 202, 204 may include a plurality of force- or torque-controlled actuators acting upon several degrees of freedom. A plurality of impedance modules may be defined for controlling the robot arms 202, 204 such that the end-effectors 206, 208 can collectively grasp, lift, move, or otherwise manipulate an object 210 to accomplish a given task.

As illustrated in FIG. 2, a first impedance module may be defined to drive the left hand 206 towards resting position $x_{lh0}$ using a first virtual damped spring 212, a second impedance module may be defined to drive the right hand 208 towards resting position $x_{rh0}$ using a second virtual damped spring 214, a third impedance module may be defined to drive the left elbow 216 towards resting position $x_{le0}$ using a third virtual damped spring 218, and a fourth impedance module may be defined to drive the right elbow 220 towards resting position $x_{re0}$ using a fourth virtual damped spring 222. The impedance modules may be the same as or similar to impedance modules 122 in FIG. 1A and/or impedance modules 142 in FIG. 1B. The impedance parameters for these impedance modules (e.g., spring stiffness, damping coefficient, and resting position) may be selected such that the robot can manipulate the object 210 according to a given task. In addition, a configuration-space virtual damped spring may be defined for each of the right and left arms to drive the arms to respective configurations $\theta_{r0}$ and $\theta_{l0}$ (to promote clarity in the drawings, the configuration space "springs" $\theta_{r0}$ and $\theta_{l0}$ are not shown in FIG. 2).

Using the concepts described above in conjunction with FIG. 1, a nonlinear control law for the robot 200 may be generated by summing the impedance module impedance control laws as follows:

$$\tau = J_{lh}^T(\theta_l)[k_{lh}(x_{lh0}-L_{lh}(\theta_l))+b_{lh}(\dot{x}_{lh0}-J_{lh}(\theta_l)\dot{\theta}_l)]+J_{le}^T(\theta_l)$$
$$[k_{le}(x_{le0}-L_{le}(\theta_l))+b_{le}(\dot{x}_{le0}-J_{le}(\theta_l)\dot{\theta}_l)]+K_l(\theta_{l0}-\theta_l)-$$
$$B_l(\dot{\theta}_l)+J_{rh}^T(\theta_r)[k_{rh}(x_{rh0}-L_{rh}(\theta_r))+b_{rh}(\dot{x}_{rh0}-J_{rh}(\theta_r)$$
$$\dot{\theta}_r)]+J_{re}^T(\theta_r)[k_{re}(x_{re0}-L_{re}(\theta_r))+b_{re}(\dot{x}_{re0}-J_{re}(\theta_r)$$
$$\dot{\theta}_r)]+K_r(\theta_{r0}-\theta_r)-B_r(\dot{\theta}_r)$$

in which:

$\tau$ denotes the torque generated by the control law;

$x_{lh0}$, $b_{lh}$, and $k_{lh}$ denote the impedance parameters for the left hand virtual spring (i.e., virtual spring 212);

$x_{rh0}$, $b_{rh}$, and $k_{rh}$ denote the impedance parameters for the right hand virtual spring (i.e., virtual spring 214);

$x_{le0}$, $b_{le}$, and $k_{le}$ denote the impedance parameters for the left elbow virtual spring (i.e., virtual spring 218);

$x_{re0}$, $b_{re}$, and $k_{re}$ denote the impedance parameters for the right elbow virtual spring (i.e., virtual spring 222);

$\theta_{l0}$, $B_l$, and $K_l$ denote the impedance parameters for the left arm configuration behavior;

$\theta_{r0}$, $B_r$, and $K_r$ denote the impedance parameters for the right arm configuration behavior;

$\theta_l$ and $\theta_r$ denote the actual configuration of the left and right arms, respectively;

$\dot{\theta}_l$ and $\dot{\theta}_r$ denote the configuration-space velocity of the left and right arms, respectively;

$L_{lh}$ and $L_{rh}$ denote the forward kinematic equations for the left and right hands, respectively;

$J_{lh}$, $J_{rh}$, $J_{le}$, and $J_{re}$ denote the Jacobian matrices for the left hand, right hand, left elbow, and right elbow, respectively; and $J_{lh}^T$, $J_{rh}^T$, $J_{le}^T$, and $J_{re}^T$ denote the transposes of the Jacobian matrices for the left hand, right hand, left elbow, and right elbow, respectively.

It should be understood that the above composite control law can be used to drive the left and right end-effectors 206 and 208 towards respective positions $x_{lh0}$ and $X_{rh0}$ and the left and right elbows 216 and 220 towards respective positions $x_{le0}$ and $x_{re0}$, while simultaneously driving the left and right robots arms 202 and 204 to respective configurations $\theta_{l0}$ and $\theta_{r0}$. The positions $x_{lh0}$, $x_{rh0}$, $x_{le0}$, and $x_{re0}$ and configurations $\theta_{l0}$ and $\theta_{r0}$ may be selected using any suitable techniques, examples of which are described below in conjunction with FIGS. 4 and 4A. In various embodiments, the configurations $\theta_{l0}$ and $\theta_{r0}$ are selected to be approximately compatible with the positions $x_{lh0}$, $x_{rh0}$, $x_{le0}$, and/or $x_{re0}$.

It should be noted that the composite robot control law described above is composed of six impedance modules, each of which may be computed independently and in parallel. If needed or advantageous, the control law can further be decomposed into even simpler components. For example, in some applications it may be sufficient for the configuration-space stiffness matrices $K_l$ and $K_r$ and the damping matrices $B_l$ and $B_r$ to be diagonal and positive-definite. In that case, a virtual damped spring may be assigned to each individual joint independently.

Similarly, knowledge of an object to be manipulated and/or a task to be performed may enable decomposition of an end-effector stiffness matrix (e.g., a 6×6 matrix). For example, to trace a poorly-known surface, the stiffness may be decomposed into six independent behaviors: in directions tangent to the nominal surface, stiffness should be high; in the normal direction (and in all rotational degrees of freedom) stiffness should be low. Such decomposition can reduce computation required for compositional impedance programming.

It is appreciated herein that, using the control law of Eq. 1 and/or Eq. 3, the effective stiffness and damping of the end-effector (or "endpoint") are not fully described by $k_{ef}$ and $b_{ef}$. Instead, there is also some contribution to the endpoint stiffness and damping behavior from the virtual springs and dampers placed at the robot joints.

Moreover, when using joint-space impedance to manage redundancies, if the desired configuration $\theta_0$ remains fixed, there will be increasing steady-state errors in positioning if $x_{ef0}$ (the endpoint rest position) is driven away from $L_{ef}(\theta_0)$. In some embodiments, these errors can be mitigated by keeping the joint stiffnesses K very small compared to the endpoint stiffness $k_{ef}$ when projected into joint space (as previously discussed), or by periodically re-adjusting $\theta_0$ to match the current joint positions. In other embodiments, null-space torque projections can be used to minimize (and ideally eliminate) any effect that the torques generated by the joint-space stiffness controller have on torques at the robot endpoint. This approach is discussed next.

For kinematically redundant robots (i.e. when the number of robot degrees of freedom, n, is greater than the number of endpoint-space coordinates, m, such as with robot 102 of FIG. 1, a controller may utilize two impedance control laws in parallel, as in Eq. 1 and/or Eq. 3 above. In such controllers, an endpoint-space impedance controller may be specified for a task, and a second joint-space impedance controller with small stiffness and damping relative to the endpoint stiffness $k_{ef}$ when projected into joint space may be specified to control the n−m redundant degrees of freedom.

In some embodiments of the present disclosure, techniques can be used to reduce (and ideally minimize) the divergence of net robot control behavior from that desired or appropriate for a given task. In particular, the disclosed techniques can reduce or eliminate distortion of desired endpoint-space stiffness and damping matrices resulting from adding on extra joint-space stiffness and damping. In addition, the disclosed techniques can reduce divergence that may occur as the manipulator moves away from its starting equilibrium position (where $x_{ef}=x_{ef0}=L_{ef}(\theta_0)$), resulting from the added joint-space stiffness, K.

In order to counteract these negative effects, in some embodiments, the controller may delegate complete control of all m endpoint degrees of freedom to the endpoint-space impedance controller, while also only delegating the n−m redundant degrees of freedom in the joint-space to the joint-space controller. No torques arising from the added joint-space controller will interfere with tasks performed in the endpoint-space of the robot.

It is noted that a secondary controller operating in the n−m redundant degrees of freedom does not need to be a simple impedance around a nominal set of joint angles. Examples of other secondary tasks that would control the redundant degrees of freedom in a robot might be managing elbow contact with the environment, collision avoidance, or endpoint mass matrix optimization.

An existing approach to preventing a secondary controller acting in the redundant degrees of the joint space from interfering in the endpoint degrees of freedom is to use a nullspace projection matrix. While existing approaches can be effective while the robot is well inside its workspace and has a Jacobian of full row rank (i.e. the rank of $J_{ef}$ is m, where $J_{ef}$ is defined above in the context of Eq. 2), these approaches can result in robot control becoming unstable at or near kinematic singularities.

One reason for using the additional joint-space stiffness matrix, K, is that the endpoint stiffness, $K_{ef}$, may be insufficient to apply a restoring stiffness to all n degrees of freedom in the manipulator (e.g., a robot arm). This can be seen by reflecting the endpoint-space stiffness matrix $k_{ef}$ into the joint-space. Ignoring any kinematic stiffness terms (i.e. assuming zero endpoint force), the equivalent joint-space stiffness matrix arising from an endpoint stiffness matrix is given by:

$$K_\theta = J_{ef}^T k_{ef} J_{ef} \quad \text{(Eq. 4)}$$

Here, $J_{ef}$ is of rank $r \leq m \leq n$. Since $k_{ef} \in \mathbb{R}^{m \times m}$ with rank m, then $K_\theta \in \mathbb{R}^{m \times m}$ with at most rank $r \leq n$ can be determined. This means that the joint-space reflection of the desired endpoint stiffness matrix has an n−m dimensional nullspace when the Jacobian has full row rank, and an n−r dimensional nullspace when the Jacobian does not have full row rank.

In the case where there is a non-zero force or torque on the end-effector, a different technique may be used to generate the equivalent joint-space stiffness matrix, $K_\theta$. In particular, a kinematic stiffness matrix, $\Gamma$, may be introduced as follows:

$$K_\theta = \Gamma + J_{ef}^T k_{ef} J_{ef} \quad \text{(Eq. 4a)}$$

where $\Gamma$ is an n×n matrix given by:

$$\Gamma = \frac{\partial J_{ef}^T}{\partial q} f \quad \text{(Eq. 4b)}$$

Each term of $\Gamma$ is given by:

$$\Gamma_{i,j} = \sum_{k=1}^{m} \frac{\partial^2 x_k}{\partial q_j \partial q_i} f_m \quad \text{(Eq. 4c)}$$

where f is the m×1 vector of forces at the endpoint of the robot. In the case when the robot endpoint is not in contact with the environment, f is zero and Eq. 4a simplifies to Eq. 4.

It is appreciated herein that an improved approach for controlling these nullspace motions is to generate an n−r joint-space stiffness matrix that spans the nullspace of $k_{ef}$ reflected into the joint-space. Doing so can allow for control the redundant degrees of freedom without impacting the endpoint-space interactive properties. An illustrative process and controller for achieving this result are described next.

First, an eigenvalue decomposition can be performed on the reflection the endpoint stiffness matrix into joint-space ($K_\theta$):

$$K_\theta = V\Lambda V^{-1} \quad \text{(Eq. 5)}$$

Here, V is a matrix whose columns are the eigenvectors of $K_\theta$, and $\Lambda$ is a diagonal matrix of eigenvalues of $K_\theta$, some of which are zero if m<n. Given a matrix $K_\theta$, the eigenvector decomposition process can include finding a matrix V and a matrix $\Lambda$ such that the following requirements are satisfied: (a) $\Lambda$ is diagonal, (b) V has normalized columns, and (c) $K_\theta = V\Lambda V^{-1}$ (as in Eq. 5). If $k_{ef}$ is chosen to be symmetric, $K_\theta$ will also be symmetric, which means that V is orthogonal and all the eigenvalues are real. Therefore, $V^{-1} = V^T$ and as a result:

$$K_\theta = V\Lambda V^T \quad \text{(Eq. 6)}$$

In the case where the Jacobian has full row rank (corresponding to conditions where the robot is well within its dexterous workspace), r=m. The structure of these matrices in this case are as follows:

$$K_\theta = \begin{bmatrix} | & | & & | \\ v_1 & v_2 & \cdots & v_n \\ | & | & & | \end{bmatrix} \begin{bmatrix} 0 & & 0 & \cdots & 0 \\ & \ddots & & \ddots & \vdots \\ & & 0 & & 0 \\ 0 & & & \lambda_1 & \\ \vdots & \ddots & & & \ddots \\ 0 & \cdots & 0 & & & \lambda_m \end{bmatrix} \begin{bmatrix} - & v_1 & - \\ - & v_2 & - \\ & \vdots & \\ - & v_n & - \end{bmatrix} \quad \text{(Eq. 7)}$$

In the diagonal matrix, there are (n−m) diagonal zero entries (which remain zero), and m non-zero eigenvalues. As can be seen with this decomposition, the nullspace dimension is (n−m) and the first (n−m) eigenvectors are the nullspace basis vectors. The m non-zero eigenvalues and eigenvectors multiply to give the $K_\theta$ matrix.

The nullspace can be filled by replacing the (n−m) zeros on the diagonal with selected finite positive real values. These nullspace replacement values may have any convenient value selected based on the requirements for a particular robot task. For example, larger values may be chosen if it is desirable to have additional joint stiffness for a given task. One factor that can be used to select the nullspace replacement values is a desired sensitivity to endpoint position and inertia (this may be of particular usefulness in scenarios where the position of an endpoint cannot be determined directly, but instead must be inferred based on the joint position). Those skilled in the art will appreciate that other uses of the nullspace configuration are possible (i.e., other factors and considerations can be used to select the nullspace replacement values).

With the nullspace values replaced by positive real values, the matrix can be multiplied out to obtain a full rank version of $K_\theta$, referred to herein as $K_{\theta,Full}$. The eigenstructure becomes:

$$K_{\theta,Full} = \begin{bmatrix} | & | & & | \\ v_1 & v_2 & \cdots & v_n \\ | & | & & | \end{bmatrix} \begin{bmatrix} k_1 & & 0 & \cdots & 0 \\ & \ddots & & & \vdots \\ & & k_{n-m} & & 0 \\ 0 & & & \lambda_1 & \\ \vdots & \ddots & & & \ddots \\ 0 & \cdots & 0 & & & \lambda_m \end{bmatrix} \begin{bmatrix} - & v_1 & - \\ - & v_2 & - \\ & \vdots & \\ - & v_n & - \end{bmatrix} \quad \text{(Eq. 8)}$$

The nullspace replacement values, $k_i$, correspond to stiffnesses that will provide a restoring force to any perturbations in the manipulator nullspace. This ensures that if $K_{\theta,Full}$ is full rank, and thus, the robot will not have any uncontrolled nullspace motions.

The full-rank joint space stiffness matrix, $K_{\theta,Full}$, can be broken up into a rank m endpoint stiffness matrix, and a rank n−m joint-space stiffness matrix that operates in the nullspace of the joint-space stiffness matrix. In some embodiments, this can be done by treating the matrix multiplication in Eq. 8 as a sum of n rank one matrices of size n×n. This permits $K_{\theta,Full}$ to be broken down into an original $K_\theta$ matrix and a nullspace-filled $K_{\theta,Null}$ matrix, as follows:

$$K_{\theta,Full} = K_{\theta,Null} + K_\theta = \begin{bmatrix} | \\ v_1 \\ | \end{bmatrix} k_1 [ - \; v_1 \; - ] + \quad \text{(Eq. 9)}$$
$$\ldots + \begin{bmatrix} | \\ v_{n-m} \\ | \end{bmatrix} k_{n-m} [ - \; v_{n-m} \; - ] + \begin{bmatrix} | \\ v_{n-m+1} \\ | \end{bmatrix} \lambda_1 [ - \; v_{n-m+1} \; - ] +$$
$$\ldots + \begin{bmatrix} | \\ v_n \\ | \end{bmatrix} \lambda_m [ - \; v_n \; - ]$$

This summation can be written more compactly as:

$$K_{\theta,Full} = K_{\theta,Null} + K_\theta = \Sigma_{i=1}^{n-m} v_i k_i v_i^T + \Sigma_{i=(n-m+1)}^{n} v_i \lambda_i v_i^T \quad \text{(Eq. 10)}$$

Thus, the first n−m terms in the sum encode the filled nullspace portion of the matrix and the last m terms in the sum represent the original $K_\theta$ matrix, which encodes the original endpoint stiffness matrix, $k_{ef}$.

The process disclosed above can also be used to generate a nullspace-filled damping matrix, $B_{\theta,Null}$, by starting with the endpoint damping matrix, $b_{ef}$ instead of the endpoint stiffness matrix, $k_{ef}$.

The robot controller of Eq. 3 can be modified to use nullspace-filled matrices as follows:

$$\tau_{ef+c} = J_{ef}^T(\theta)[k_{ef}(x_{ef0} - L_{ef}(\theta)) + b_{ef}(\dot{x}_{ef0} - J_{ef}(\theta)\dot{\theta})] + K_{\theta,Null}(\theta_0 - \theta) - B_{\theta,Null}(\dot{\theta}) \quad \text{(Eq. 11)}$$

As discussed above, the equivalent joint-space stiffness matrix, $K_\theta$, used in the control law of Eq. 11 may be generated in two different ways. According to a first technique, $K_\theta$ may be generated by "assuming" that the end-effector is not in contact with the environment, that is by ignoring non-zero force/torque on the end-effector force/torque even if it may happen to exist. This first technique is illustrated, for example, by Eq. 4 above. According to a second technique, non-zero force/torque on the end-effector may be taken into account when generating $K_\theta$. This second technique is illustrated, for example, by Eqs. 4a, 4b, and 4c above. Thus, depending on which technique is used to generate the equivalent joint-space stiffness matrix, $K_\theta$, two different control laws may be arrived at using Eq. 11. It is appreciated herein that, in some applications, it may be desirable to choose the first technique in order to reduce computational complexity.

The controller of Eq. 11 can be used to achieve proper restoring torques (parameterized by $k_1 \ldots k_n$) without interfering with the desired endpoint behavior.

Figure 3A:
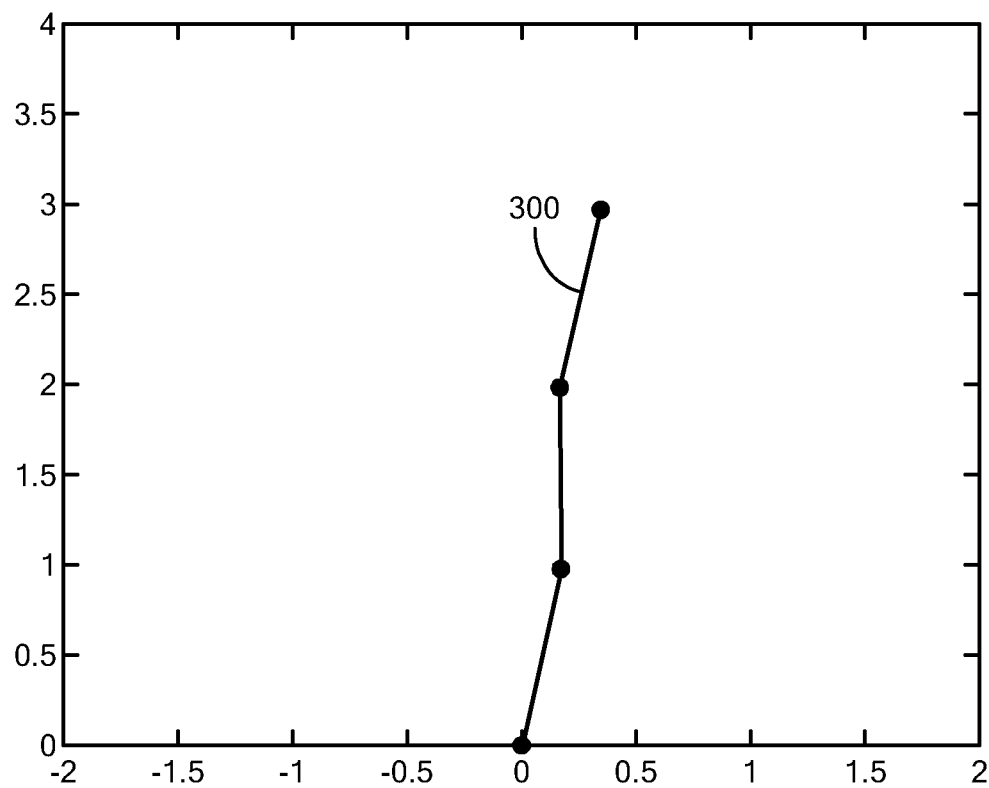
FIG. 3A is a diagram showing a three link planar robot at non-singular configuration, in accordance with some embodiments.
Figure 3B:
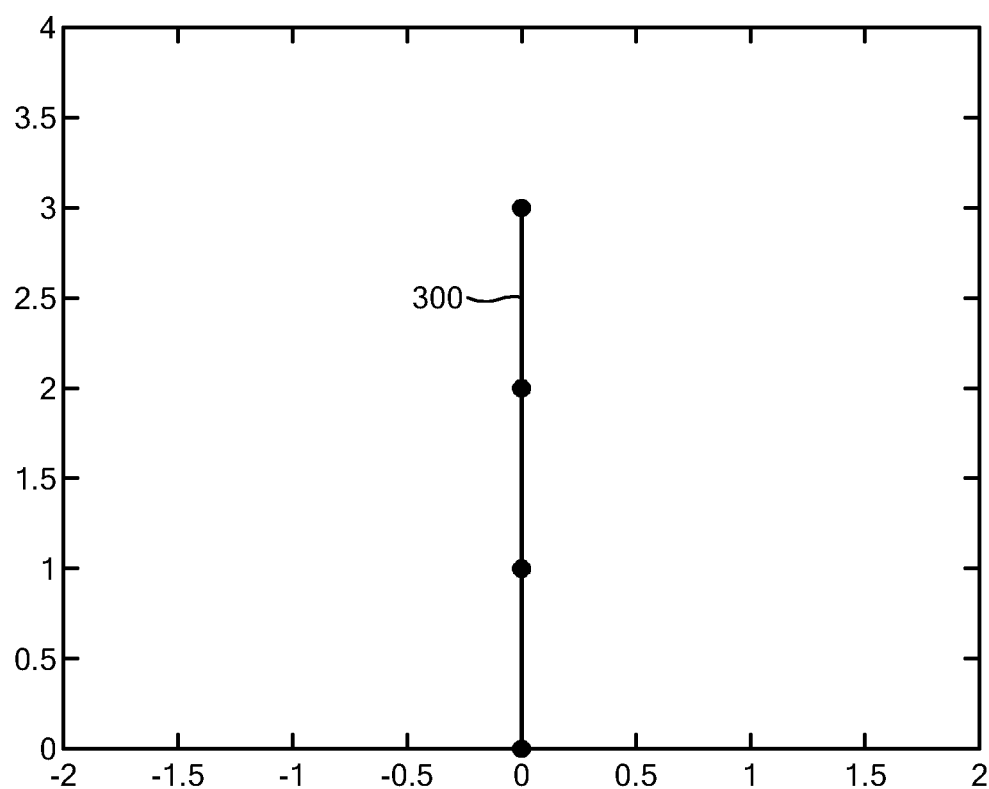
FIG. 3B is a diagram showing a three link planar robot at singular configuration, in accordance with some embodiments.
Figure 3C:
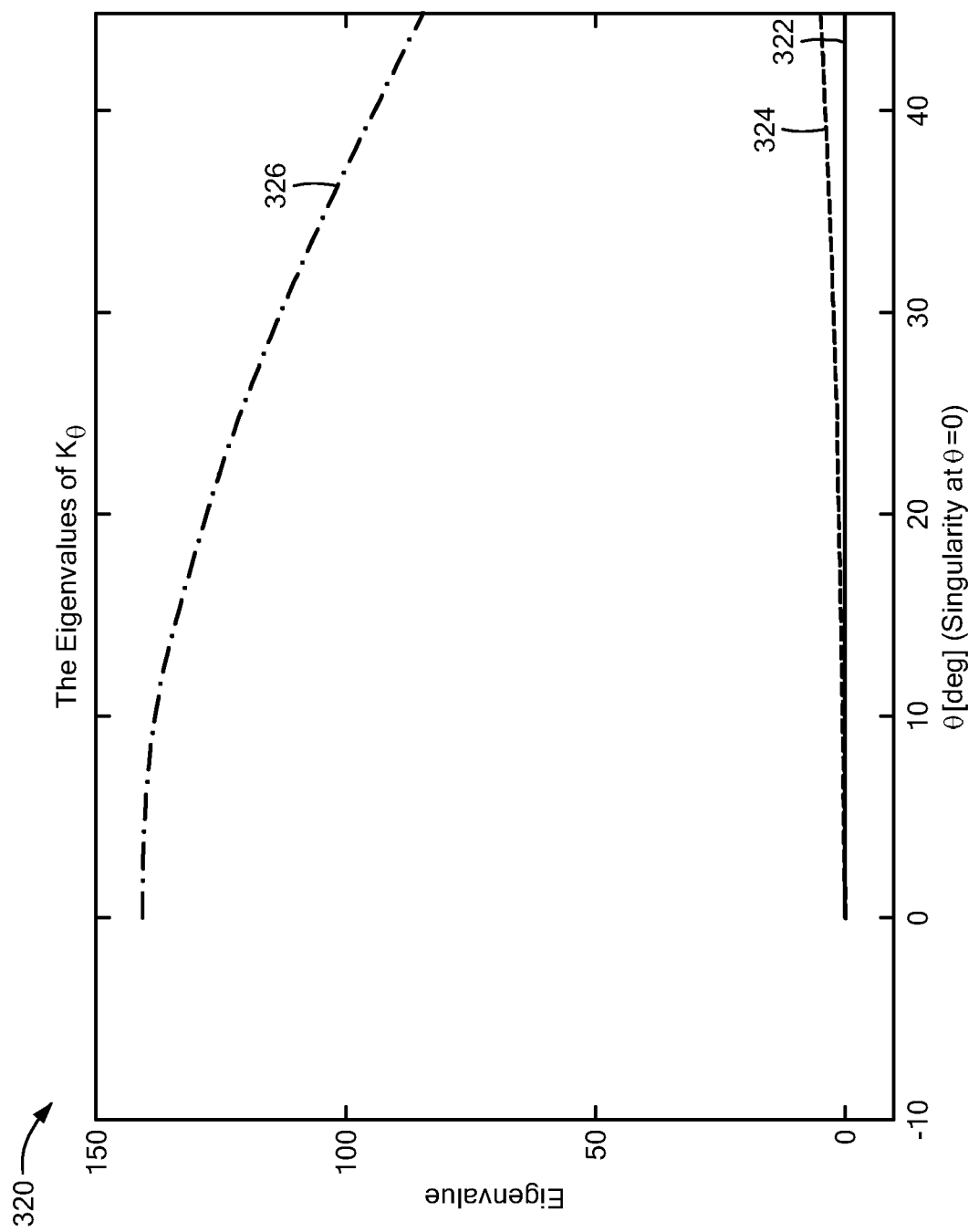
FIG. 3C is a graphical diagram illustrating control variables that may be associated with a three link planar robot as it approaches singularity, in accordance with some embodiments.

Turning to FIGS. 3A-3C, in some embodiments, the robot control law of Eq. 11 can be dynamically adjusted to provide improved control as the robot transitions into or out of a singularity. FIGS. 3A and 3B shows a three link planar robot 300, with the robot in a singular configuration in FIG. 3B. For a redundant robot, such as robot 300, when the eigendecomposition in Eqs. 3 and 4 is carried out, if the robot is not at singularity, there will be n–m near zero-valued eigenvalues.

When the control law is implemented, it is necessary to check which eigenvalues are zero, separate out the zero valued eigenvalue/eigenvector pairs, replace the zero values, and then form the null-filled impedance matrix (i.e., $K_{\theta,Null}$ or $B_{\theta,Null}$). When floating point eigenvector/eigenvalue computations are used, the values in question may not actually be zero, but rather, they may become very small (e.g., on the order of $10^{-14}$ or $10^{-15}$ or other values depending on the particular computer architecture used or other implementation details). This is due to the finite precision of floating point arithmetic. Thus, in some embodiments, a threshold value may be used to determine the eigenvalue zeros. When the eigenvalues are below this threshold, they are replaced with a finite positive real number. As used herein, the term "near-zero-valued eigenvalue" refers to an eigenvalue that is equal to or approximately equal to zero. In some embodiments, a near-zero-valued eigenvalue is a value less than a predetermined threshold value (e.g., less than $10^{-14}$ or $10^{-15}$). The term "non-zero-valued eigenvalue" can refer to an eigenvalue that is greater than or equal to the predetermined threshold value (e.g., greater than or equal to $10^{-14}$ or $10^{-15}$).

It is recognized herein that using this threshold approach has the potential to effect robot control performance when transitioning from a non-singular robot configuration to a singular configuration. As the robot is brought into singularity, one or more of the non-zero eigenvalues will become zero as the Jacobian loses rank.

FIG. 3C shows an illustrative chart 300 of the eigenvalues of $K_\theta$ as a robot goes from a non-singular configuration (FIG. 3A) to a singular configuration (FIG. 3B). The chart 300 includes three curves 322, 324, 326, which may correspond to the three eigenvalues of $K_\theta$. Starting on the right side, the configuration parameter ($\theta$) may be 45°, indicating that (for this illustrative robot), the robot is inside its dexterous workspace. Moving right to left in graph 320, as $\theta$ reaches 0°, the robot reaches singularity. A first eigenvalue 322 is always zero in this example. A second eigenvalue 324 is non-zero when away from the singularity, then becomes zero when the robot reaches singularity.

As mentioned above, when using floating point arithmetic, it may be necessary to define a threshold for the decision to replace a very small eigenvalue with a finite positive real number. Having this threshold may introduce abrupt, discontinuous changes of torque when previously large eigenvalues begin to approach zero near singularity as very small eigenvalues may be suddenly replaced with a relatively large number (i.e., the selected nullspace replacement values, $k_i$).

To provide improved control, in some embodiments, the replacement eigenvalue for a previously large eigenvalue that approaches zero near singularity may be iteratively increased (e.g., linearly ramped up) from a relatively small value (i.e., a threshold value) to the desired nullspace replacement value (e.g., 1.0) as the manipulator proceeds toward singularity, such that the eigenvalue reaches 1.0 just before singularity. This can result in continuous or near-continuous torque control as the robot transitions into a singularity.

For example, referring to FIG. 3C, assume that the threshold value is set at 0.0003 and replacement value of second eigenvalue 324 is selected to be 1.0. As singularity is approached (from right to left in the graph), the value of second eigenvalue 324 steadily decreases and eventually crosses the threshold and remains below it. When the threshold is crossed (i.e., eigenvalue 324 is below 0.0003), then it is replaced with the threshold value 0.0003 and then linearly ramped up to 1.0.

This technique can be applied in situations where the various eigenvectors of $K_\theta$ can be determined and where it is possible to determine when the robot is approaching a singularity. In this case, if any eigenvalue crosses a small threshold as the singularity is approached, that replacement value can be slowly ramped up before singularity is reached. Replacing the eigenvalue with a positive real number in a continuous fashion before singularity is reached can reduce (and ideally eliminate) rapid changes in torque as a singularity is approached.

Figure 4:
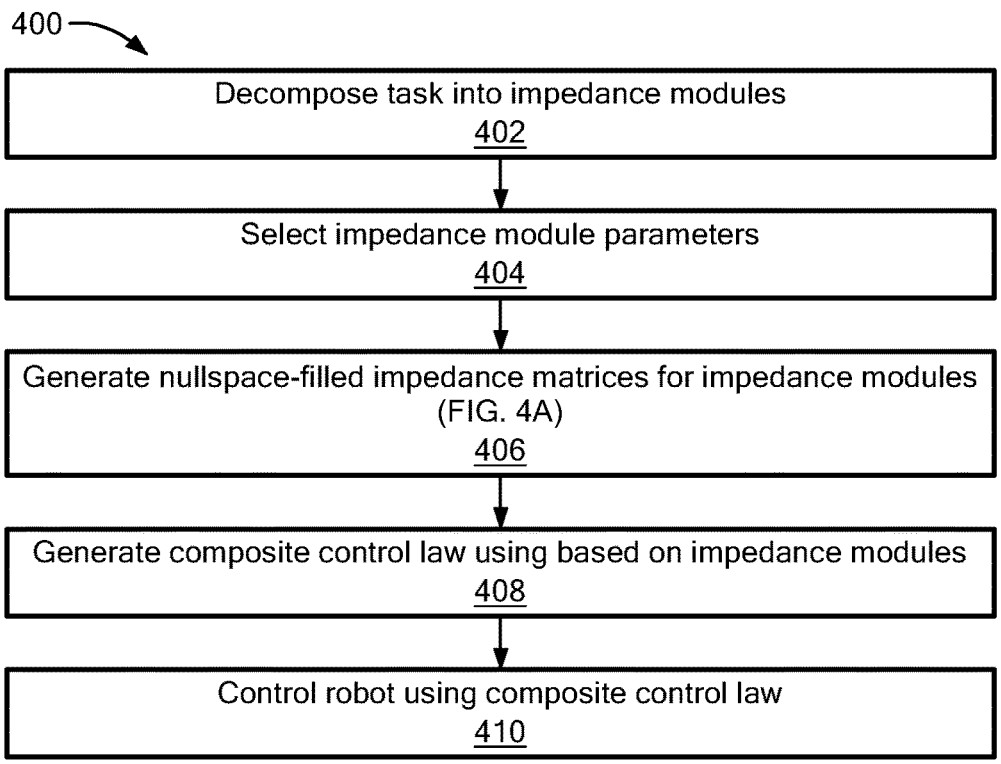
FIGS. 4 and 4A are flow diagrams illustrating processing that may occur within a robot control system, in accordance with some embodiments.
Figure 4A:
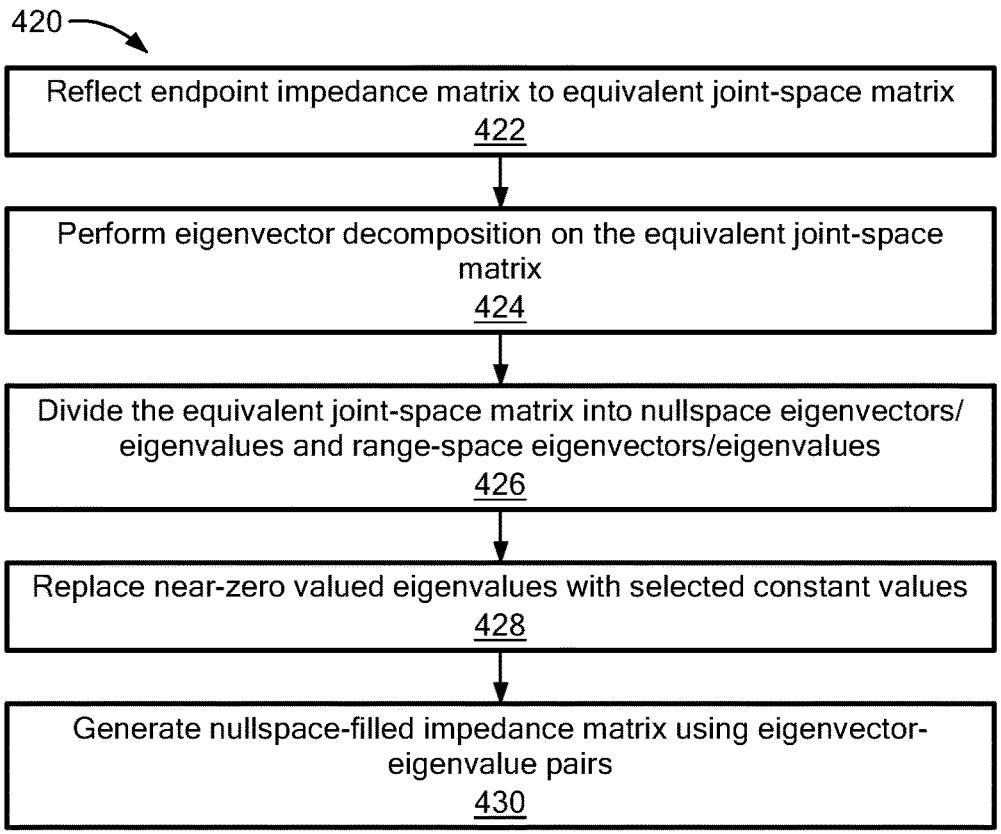

FIGS. 4 and 4A are flow diagrams showing illustrative processing that can be used to control a robot (e.g., robot 102 in FIG. 1 and/or robot 200 of FIG. 2). At least a portion of the processing described herein may be implemented within an impedance controller (e.g., controller 108 in FIG. 1, controller 124 of FIG. 1A, and/or controller 144 of FIG. 1B).

Rectangular elements (typified by element 302 in FIG. 4), herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order. In some embodiments, the processing blocks represent states and transitions, respectively, within a finite-state machine, which can be implemented in software and/or hardware.

Referring to FIG. 4, a method 400 begins at block 402, where a task to be performed by a robot may be decomposed into multiple impedance-based impedance modules. Non-limiting examples of impedance modules include: (1) using an end-effector to manipulate an object (e.g., to grasp or push an object); (2) using a robot's elbow to manipulate an object (e.g., to pin an object between the robot's arm and trunk); (3) releasing an object grasped/pinned by the robot; and (4) imposing a "base" or "reference" joint stiffness for the robot.

At block 404, impedance parameters are selected for each of the impedance modules. For example, if a given impedance module uses a damped spring control law to manipulate an object using an end-effector, a resting position, a stiffness, and a damping coefficient may be selected. As another example, impedance parameters may be selected to achieve a joint configuration that will reduce (and ideally minimize) apparent end-effector mass normal to an object's surface. In some embodiments, techniques described in the '946 patent may be used to select impedance parameters.

At block 406, a nullspace-filled impedance matrix may be generated for one or more of the impedance modules. In some embodiments, two nullspace-filled matrices may be generated for a given module: one to control stiffness and one to control damping. A detailed process for generating a nullspace-filled stiffness/damping matrix as described below in the context of FIG. 4A. The nullspace-filled stiffness and/or damping matrix, along with the selected parameters from block 404, can be used to define a modular impedance control law for the robot, as discussed above in the context of Eq. 11.

At block 408, a composite control law for the robot is generated using the configuration-space impedance module control laws. As described above in conjunction with FIG. 1, the composite control law may be generated by summing the control laws of each of the individual impedance modules. Block 408 may include transforming one or more of the impedance module control laws into the robot's configuration space. For example, a Cartesian-space control law for an end-effector may be transformed into configuration space using a Jacobian matrix associated with the end-effector. It should be understood that one or more of the impedance modules may be defined in terms of configuration-space control laws and, thus, such control laws do not need to be transformed.

At block 410, the composite control law is used to control the robot using, for example, a force-based or a position-based impedance controller, as described above in conjunction with FIGS. 1, 1A, and 1B. Any suitable criteria can be used to determine when controller execution should end. For example, execution may end when certain external conditions are detected or when a given number of processing cycles has been exceeded. In some embodiments, the control law can be dynamically adjusted as the robot approaches singularity using the technique described above in the context of FIGS. 3A, 3B, and 3C.

Referring to FIG. 4A, a method 420 can be used for generating a nullspace-filled impedance matrix (e.g., a nullspace-filled stiffness matrix or a nullspace-filled damping matrix) for an impedance control module. The method 420 may receive, as input, a desired endpoint stiffness matrix $k_{ef}$ or damping matrix $b_{ef}$. This matrix, which is referred to herein as the "desired endpoint impedance matrix," may be selected as a parameter of the impedance module.

At block 422, the desired endpoint impedance matrix may be reflected into an equivalent joint-space impedance matrix, such as described above in the context of Eq. 4 and/or Eq. 4a. In some embodiments, an assumption can be made that there are no contact forces on the endpoint.

At block 424, eigenvector decomposition can be performed on the joint-space impedance matrix, such as described above in the context of Eqs. 5 and 6.

At block 426, the decomposed matrix can be divided into the nullspace eigenvectors/eigenvalues (the near-zero-valued eigenvalues), and the range-space eigenvectors/eigenvalues (the non-zero-valued eigenvectors), such as described above in the context of Eq. 7.

At block 428, the near-zero valued eigenvalues can be replaced with selected finite positive real values. Factors that may be considered when selecting the nullspace replacement values are described above in the context of Eq. 8. In some embodiments, a threshold value may be specified to determine if a specific eigenvalue is near-zero valued or non-zero valued (this may be important if the method 420 is implemented in a computer using floating point arithmetic). In some embodiments, block 428 can further include iteratively increasing one or more eigenvalues approaching zero at singularity from a threshold value to corresponding selected finite positive real values.

At block 430, the eigenvector-eigenvalue pairs can be used to construct or otherwise generate a nullspace-filled impedance matrix, such as described above in the context of Eqs. 9 and 10. The nullspace-filled impedance matrix can be used as part of the robot control law, such as described above in the context of Eq. 11.

Figure 5:
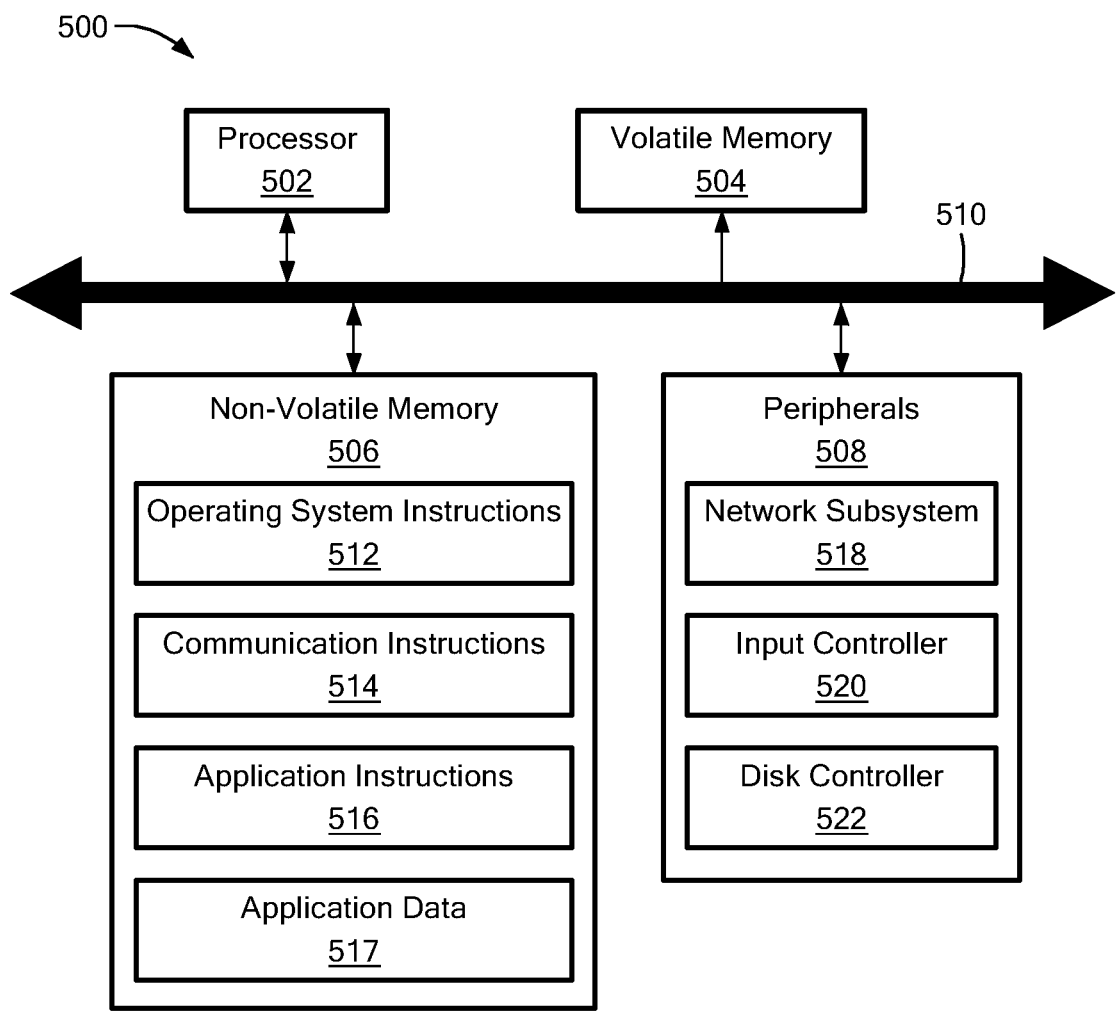
FIG. 5 is block diagram of a processing device on which methods and processes disclosed herein can be implemented, according to some embodiments of the disclosure.

FIG. 5 shows an illustrative server device 500 that may implement various features and processes as described herein (e.g., the processing described above in the context of FIGS. 4 and 4A). The server device 500 may be implemented on any electronic device that runs software applications derived from compiled instructions, including without limitation personal computers, servers, smart phones, media players, electronic tablets, game consoles, email devices, etc. In some implementations, the server device 500 may include one or more processors 502, volatile memory 504, non-volatile memory 506, and one or more peripherals 508. These components may be interconnected by one or more computer buses 510.

Processor(s) 502 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 510 may be any known internal or external bus technology, including but not limited to ISA, EISA, PCI, PCI Express, NuBus, USB, Serial ATA or FireWire. Volatile memory 504 may include, for example, SDRAM. Processor 502 may receive instructions and data from a read-only memory or a random access memory or both. The essential elements of a computer may include a processor for executing instructions and one or more memories for storing instructions and data.

Non-volatile memory 506 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 506 may store various computer instructions including operating system instructions 512, communication instructions 514, application instructions 516, and application data 517. Operating system instructions 512 may include instructions for implementing an operating system (e.g., Mac OS®, Windows®, or Linux). The operating system may be multi-user, multiprocessing, multitasking, multithreading, real-time, and the like. Communication instructions 514 may include network communications instructions, for example, software for implementing communication protocols, such as TCP/IP, HTTP, Ethernet, telephony, etc.

Peripherals 508 may be included within the server device 500 or operatively coupled to communicate with the server device 500. Peripherals 508 may include, for example, network interfaces 518, input devices 520, and storage devices 522. Network interfaces may include for example an Ethernet or Wi-Fi adapter. Input devices 520 may be any known input device technology, including but not limited to a keyboard (including a virtual keyboard), mouse, trackball, and touch-sensitive pad or display. Storage devices 522 may include one or more mass storage devices for storing data files; such devices include magnetic disks, such as internal hard disks and removable disks; magneto-optical disks; and optical disks.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

The invention claimed is:

1. A computer-implemented method for controlling a robot having an endpoint and a plurality of joints providing more than three degrees of freedom (DoFs), the method comprising:
   receiving an endpoint impedance matrix representing a desired stiffness or damping at the robot endpoint;
   reflecting the endpoint impedance matrix to an equivalent joint-space matrix associated with one or more of the robot joints, the equivalent joint-space matrix having a nullspace corresponding to near-zero-valued eigenvalues;
   generating a nullspace-filled impedance matrix from the equivalent joint-space matrix based in part on replacing the near-zero-valued eigenvalues with selected finite positive real values, wherein the replacing of the near-zero-valued eigenvalues with the selected finite positive real values includes, in response to detecting that the robot is approaching a kinematic singularity, increasing one or more eigenvalues from a threshold value to the corresponding selected finite positive real value;
   generating a robot control law using the nullspace-filled impedance matrix; and
   using the robot control law to control the robot.

2. The method of claim 1, further comprising:
   determining forces/torques at the endpoint resulting from contact between the endpoint and an environment of the robot;
   generating a kinematic stiffness matrix based on the forces/torques at the endpoint; and
   generating the equivalent joint-space matrix using the kinematic stiffness matrix.

3. The method of claim 1, further comprising:
   in response to detecting that the robot is approaching a kinematic singularity, updating the robot control law by iteratively increasing one or more eigenvalues approaching zero as the singularity is neared from a threshold value to the corresponding selected finite positive real value, wherein the threshold value is less than the corresponding selected final positive real value; and
   using the updated robot control law to control the robot.

4. The method of claim 3, wherein the threshold value is selected based on a floating point arithmetic precision of the computer.

5. A computer-implemented method for controlling a robot having an endpoint and a plurality of joints providing more than three degrees of freedom (DoFs), the method comprising:
   selecting impedance parameters for each of a plurality of impedance modules, wherein each of the plurality of impedance modules specifies a robot behavior associated with a task;
   for one or more of the impedance modules:
      receiving an endpoint impedance matrix representing a desired stiffness or damping at the robot endpoint,
      reflecting the endpoint impedance matrix to an equivalent joint-space matrix associated with one or more of the robot joints, the equivalent joint-space matrix having a nullspace corresponding to near-zero-valued eigenvalues,
      generating a nullspace-filled impedance matrix from the equivalent joint-space matrix based in part on replacing the near-zero-valued eigenvalues with selected finite positive real values, wherein the replacing of the near-zero-valued eigenvalues with the selected finite positive real values includes, in response to detecting that the robot is approaching a kinematic singularity, increasing one or more eigenvalues from a threshold value to the corresponding selected finite positive real value, and
      defining an impedance control law for the module using the nullspace-filled stiffness matrix and the impedance parameters selected for the module;
   generating a composite control law for the robot using impedance module control laws defined for the impedance modules; and
   using the composite control law to control the robot.

6. The method of claim 5, further comprising:
   determining forces/torques at the endpoint resulting from contact between the endpoint and an environment of the robot;
   generating a kinematic stiffness matrix based on the forces/torques at the endpoint; and
   generating the equivalent joint-space matrix using the kinematic stiffness matrix.

7. The method of claim 5, further comprising:
   in response to detecting that the robot is approaching a kinematic singularity, updating the robot control law by iteratively increasing one or more eigenvalues approaching zero as the singularity is neared from a threshold value to the corresponding selected finite positive real value, wherein the threshold value is less than the corresponding selected final positive real value; and
   using the updated robot control law to control the robot.

8. The method of claim 7, wherein the threshold value is selected based on a floating point arithmetic precision of the computer.

9. The method of claim 5, further comprising:
transforming one or more of the impedance module control laws into configuration space,
wherein generating the composite control law for the robot includes generating the composite control law using the impedance module controls laws transforming into configuration-space.

10. The method of claim 5, wherein at least one of the impedance modules defines a damped spring control law to manipulate an object using an end-effector of the robot.

11. The method of claim 5, wherein at least one of the impedance modules defines a damped spring control law to manipulate an object using an elbow of the robot.

12. The method of claim 5, wherein at least one of the impedance modules imposes a base joint stiffness on the robot.

13. The method of claim 5, wherein selecting impedance parameters for each of a plurality of impedance modules includes selecting, for at least one of the impedance modules, a resting position, a stiffness, and a damping coefficient for a damped spring control law.

14. The method of claim 5, wherein selecting impedance parameters for each of a plurality of impedance modules includes selecting, for at least one of the impedance modules, a base joint stiffness for the robot.

15. The method of claim 5 wherein selecting the base joint stiffness for the robot includes selecting a base joint stiffness to reduce apparent end-effector mass normal to an object's surface.

16. A system comprising:
a robot having an endpoint and a plurality of joints providing more than three degrees of freedom (DoFs); and
an impedance controller configured to:
receive an endpoint impedance matrix representing a desired stiffness or damping at the robot endpoint;
reflect the endpoint impedance matrix to an equivalent joint-space matrix associated with one or more of the robot joints, the equivalent joint-space matrix having a nullspace corresponding to near-zero-valued eigenvalues;
generate a nullspace-filled impedance matrix from the equivalent joint-space matrix based in part on replacing the near-zero-valued eigenvalues with selected finite positive real values, wherein the replacing of the near-zero-valued eigenvalues with the selected finite positive real values includes, in response to detecting that the robot is approaching a kinematic singularity, increasing one or more eigenvalues from a threshold value to the corresponding selected finite positive real value;
generate a robot control law using the nullspace-filled impedance matrix; and
use the robot control law to control the robot.

17. The system of claim 16, wherein the impedance controller is further configured to:
determine forces/torques at the endpoint resulting from contact between the endpoint and an environment of the robot;
generate a kinematic stiffness matrix based on the forces/torques at the endpoint; and
generate the equivalent joint-space matrix using the kinematic stiffness matrix.

18. The system of claim 16, wherein the impedance controller is further configured to:
in response to detecting that the robot is approaching a kinematic singularity, update the robot control law by iteratively increasing one or more eigenvalues approaching zero as the singularity is neared from a threshold value to the corresponding selected finite positive real value, wherein the threshold value is less than the corresponding selected final positive real value; and
use the updated robot control law to control the robot.

19. The system of claim 18, wherein the threshold value is selected based on a floating point arithmetic precision of the controller.

* * * * *